July 30, 1963  F. LERMAN ET AL  3,099,697
LIQUID REDISTRIBUTOR FOR TOWERS
Filed Dec. 30, 1958  2 Sheets-Sheet 1

INVENTORS
FRANK LERMAN
JOHN BOHNLOFINK

July 30, 1963 F. LERMAN ET AL 3,099,697
LIQUID REDISTRIBUTOR FOR TOWERS
Filed Dec. 30, 1958 2 Sheets-Sheet 2

INVENTORS
FRANK LERMAN
JOHN BOHNLOFINK 3,099,697
LIQUID REDISTRIBUTOR FOR TOWERS
Frank Lerman, Cincinnati, Ohio, and John Bohmlofink, Baltimore, Md., assignors to National Distillers and Chemical Corporation, New York, N.Y., a corporation of Virginia
Filed Dec. 30, 1958, Ser. No. 783,759
2 Claims. (Cl. 261—97)

This invention relates to towers or columns that are used for absorption, stripping, distillation, extraction, and other operations involving contacting a liquid with another fluid, such as a gas, a vapor, or another liquid. It relates more particularly to means for improving the effectiveness of liquid flow through such towers so as to obtain improved operation and efficiencies.

It is known that liquid streams moving vertically through packing in packed towers in counterflow to another fluid are diverted and spread in a generally horizontal direction by the individual packing units they encounter and, to some extent, by the liquid movement of the other fluid. Such flow is normal and desirable for obtaining extended interface surface and good interdistribution between the fluids for intimate contacting. However, this horizontal diversion of liquid tends to cause most of it, eventually, to reach the inner wall of the tower. The liquid thus accumulates on the tower wall and flows vertically along it at a faster rate than through the packing. Only after sizable amounts have accumulated on the wall, will there be any noticeable return from the wall to the packing through the diverting effect of packing adjacent to the wall. Liquid accumulations on the wall have limited contact, through reduced surface and contact time, with the counterflowing fluid, and the effectiveness and performance of the tower operation is measurably decreased when such accumulations occur.

In the prior art, attempts have been made to solve this problem by providing the tower walls with annular troughs or channels having radially extending tubes or channels which were designed to intercept and redistribute the liquid therein. Such devices, however, result in costly fabrication operations in building up the edges of the annular collecting channels or rings and in forming, attaching and supporting the radial distribution tubes or channels thereto. Moreover, such annular collecting rings tend to increase the liquid hold-up in the column and at the same time become clogged with solid particles.

Accordingly, it is an object of the present invention to provide a liquid redistributor of such construction that it avoids the aforesaid problems and, moreover, is simple and economical to fabricate.

Another object of the present invention is to provide a redistributor element which deflects liquids flowing vertically along or near the wall of the packed tower to predetermined locations within the bed of packing material.

Still another object is to provide a redistributor which will result in a minimum reduction of the tower cross-sectional area so as not to increase the pressure drop therethrough or otherwise reduce the efficiency of tower operation.

These and other objects of the present invention will become more apparent when taken in connection with the following description and drawings in which.

The redistributor elements herein contemplated have an outer substantially horizontal annular rim, the outer diameter of which is fixed into a tight liquid seal against the inner wall of the vertical packed tower or column by welding it to the tower wall, securing it between flanged sections, or other suitable means. The element may be stamped out of a single sheet of metal in one flat piece and then formed into inwardly and downwardly extending projections or vanes which are designed so that most of the liquid will flow toward the center of the column and off the inner end of each of said vanes. FIGURES 2 and 3a to 3d each illustrate a plan view of the respective redistribution elements as they would appear before the projections are bent downwardly.

This liquid redistributor can be made in a variety of configurations as herein illustrated, but each embodiment includes the features of a horizontal annular section and a radially and downwardly extending projection for directing the liquid normally flowing along the side walls of the tower to a more central point therein.

In order to provide accurate control of liquid distribution, it is important that the inwardly extending projections taper from a relatively wide outer portion, which will collect the liquid on the horizontal annular section, to a pointed inner radial end, over which the liquid will flow into the packing in the next lower section of the tower. The tapered edges of the projections are curved concave with respect to the body of each projection. This provides the maximum open, cross-sectional area in the tower.

Figure 1:
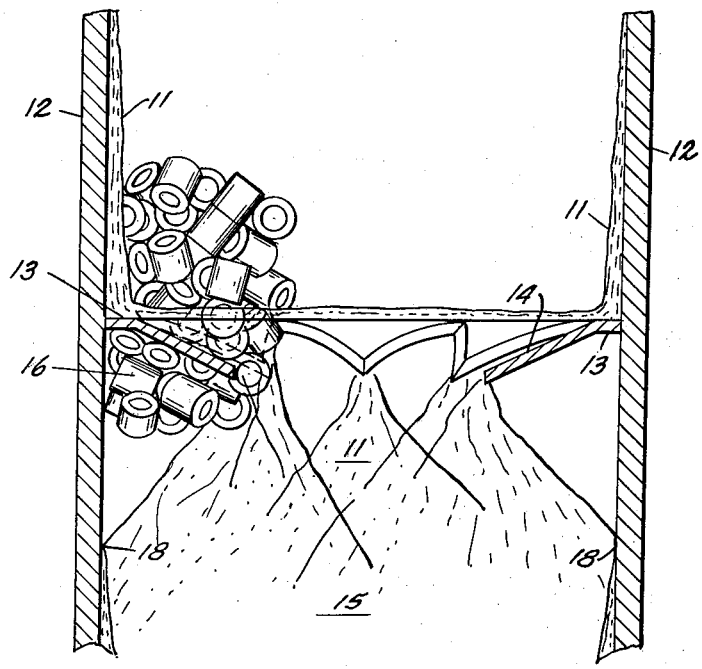
FIGURE 1 is a broken vertical cross-sectional view of a tower showing the effect of the present invention illustrating the redistribution of the flow of liquid through the tower.

Referring now to the invention in more detail and to the drawings it can be seen from FIGURE 1 that the liquid 11, in its downward flow, accumulates on the tower wall 12 in increasing quantities and runs onto the horizontal annular section 13 of the redistributor. This annular section is welded or otherwise secured to the inner wall of the tower in a sealed relationship. By providing this liquid-deflecting portion of the redistributor with a substantially flat, horizontal surface, not only is the liquid hold-up in the column minimized, but the said annular element does not tend to become clogged with solids such as tower scale and particles of broken packing material.

The collected liquid 11, flows along the surface 14 of the redistributor projections both inwardly and downwardly, spilling over into the next lower section of the tower as shown at 15. The deistributed liquid then covers the surfaces of the packing elements 16 (which are partially shown in the drawings) and further down the column again begins to collect at the side walls, as indicated at 18. This accumulation may then also be directed to the interior of the tower by another redistributor appropriately spaced in relation to the element described above.

Figure 2:
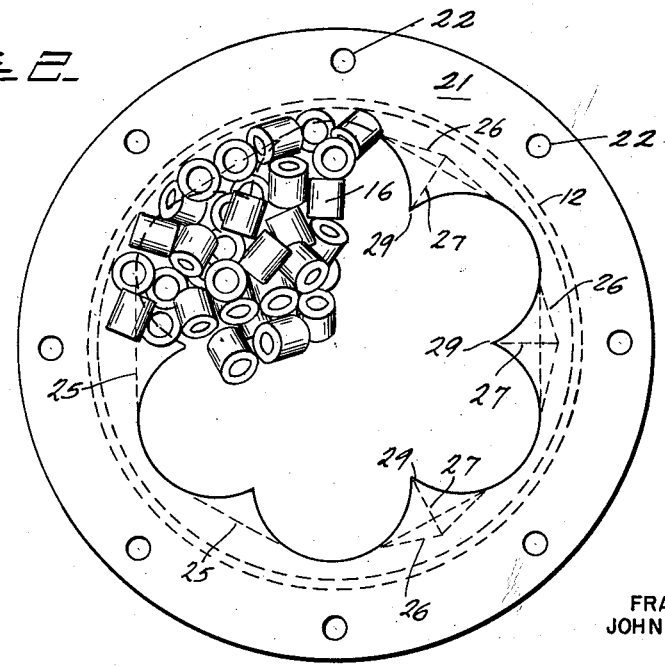
FIGURE 2 is a plan view of the particular liquid redistributor shown in FIGURE 1, which additionally shows an external rim with bolt holes so that the redistributor may be fitted between flanges of the tower sections.

FIGURE 2 illustrates a plan view of the particular redistributor element shown in FIGURE 1 which is in the form of a circular arch, and additionally indicates how the device may be provided with an external rim having an outer diameter larger than the inner diameter of the tower so that it may be fitted between the flanges of the column section. This outer rim portion 21 is provided with suitable bolt holes 22 which allow for the ready insertion of the redistributor between the flanges of the tower wall.

The annular section 13 is substantially horizontal, but the projections making up its inner edge are bent downwardly along suitable fold lines 25 as illustrated in the left hand side of the drawing or 26, 27 as illustrated at the right hand side of the drawing. In this instance, a groove line 27 may also be stamped in the projections to channel inwardly flowing liquid to the points 29. These groove lines, while desirable in some instances, are not to be considered essential in the present invention as the surface tension of the liquid will, by itself, minimize any spillage over the sides of the projections.

When it is desired to increase the cross-sectional open area of the tower, holes may be stamped in the projections. While liquid running off the sides of the projections or through the holes may not necessarily disturb liquid distribution, better control may be obtained by guiding all of the liquid to the inner radial points of the projections.

Figure 3A:
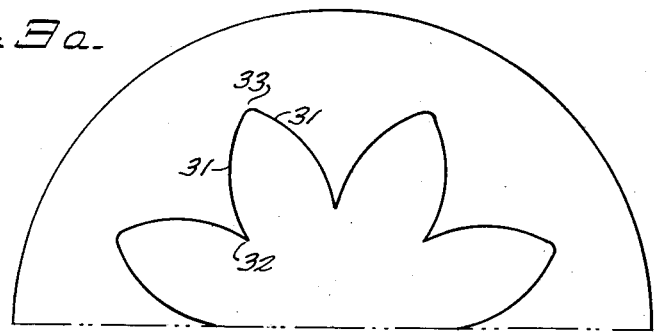
FIGURES 3a, 3b, 3c and 3d are plan views representing, in semi-circular sections, four other embodiments of the redistributor which can be constructed in accordance with the teachings of the present invention.

Obviously other embodiments and geometrical configurations for the redistributor are within the contemplation of the present invention and four such embodiments are illustrated in FIGURES 3a, 3b, 3c and 3d. In FIGURE 3a the projections or vanes are in the form of a pointed arch, said arch having arcuate sides 31 and being pointed at the inner radius 32 and at the outer radius 33. In this, as in subsequent embodiments, it should be understood that the projections may be bent downwardly along fold lines similar to those shown in FIGURE 2.

Figure 3B:
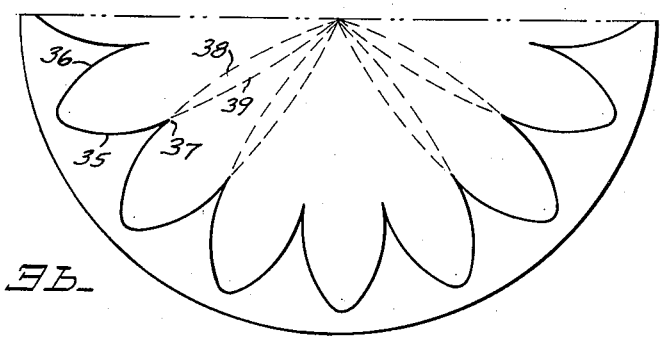

In FIGURE 3b an arrangement is shown wherein the redistributor projections in the form of overlapping rosettes having concave edges 35 and 36, and being pointed at the inner radius 37. The dotted lines 38 and 39 are illustrative of the "overlap" as it would appear on the element before it is stamped out.

Figure 3C:
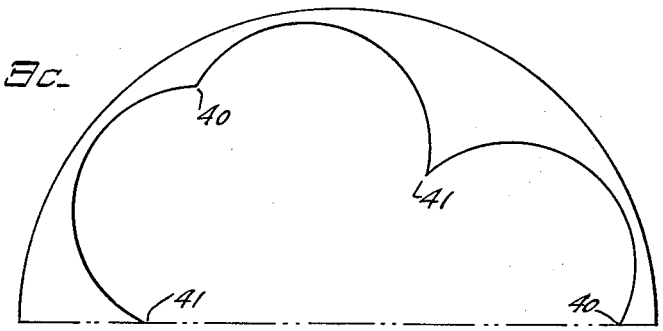

The embodiment shown in FIGURE 3c is a combination circular arch with alternately positioned inner radii 40 and 41.

Figure 3D:
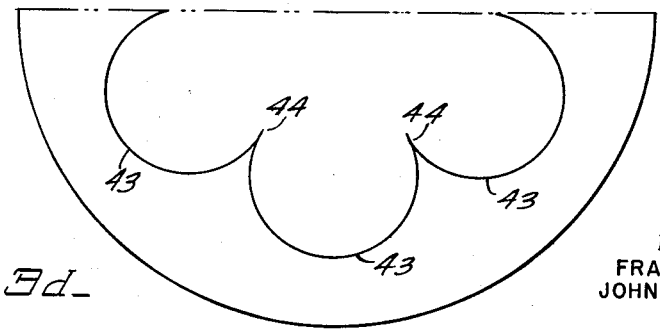

FIGURE 3d shows a radially tangential circular arch with circular concave edges 43 and inner radial points 44.

Which ever embodiment is employed, it is important that the slope of the projections is controlled within desired limits. Too steep a slope would require a longer projection to get the desired horizontal displacement of liquid and would lose some effective height of tower packing. It is preferred that the slope be between 15° and 40° from the horizontal with outer limits between 5° and 60°. Thirty degrees is a practical value giving enough slope to retain the liquid until it reaches the point and causing a good horizontal displacement of the liquid with reasonable projection length.

The particular shape used depends on the specific unit operation considered and a suitable calculation by one skilled in the art should be able to obtain optimum combinations of the desired inward radial displacement of wall liquid, the desired number of redistribution projections, the maximum open or free area within its inner perimeter, and the ease of fabrication. The open area should generally be on the order of magnitude of the percent free area of standard tower packing (70 to 90 percent). The redistributor should not interfere with the fluid flow on the packing and not significantly increase the pressure drop through the tower. Therefore, the edges of the inwardly extending projections are concave to give the maximum open, cross-sectional area for a given projection extension.

The number of projections is a matter of engineering design and is based on the consideration that while with more projections a better redistribution may be obtained, such an arrangement would be more expensive to fabricate.

One of the major advantages of the present design resides in the simple fabrication of the redistribution elements. They are readily stamped from flat sheets and being integral with the horizontal annular deflecting ledge are rigid and self-supporting. Thus, they can be formed and bent from a single unit without need of subsequent support, fastening or assembly. Each element is readily bent along the dotted lines illustrated in the drawings.

The projections are pointed at the inner radial termini thereof and the side walls are of a general concave arcuate shape. By making the projections concave upwards there will be less possibility of liquid to run over the projections before reaching the inner points, though this is not essential as the liquid, by its surface tension, will tend to be substantially retained on the flat, sloping projections as it runs down toward the points.

While the projections may be extended almost to the center line of the column it is believed that the optimum arrangement is to extend the same to the mean area radius, i.e. the radius of the circle having an area one-half of the total cross-section area. The liquid redistributed to such points could spread to as much area toward the center as toward the walls of the tower. This radius is .707 times the tower radius or about .3 of the way from the wall to the center. Generally the projections extend from 0.2 to 0.6 of the distance from the tower wall to the tower center. The redistributors herein set forth may be adapted for use in virtually all process and unit operations that use packed columns. It should be understood that in liquid extraction the inwardly radial projections could point upward or downward depending on whether the liquid collecting at the wall flows up or down (is of lesser or greater density than the other liquid phase). Redistributors are placed in the tower at predetermined intervals depending on the column size, type of packing and fluid flow rates.

Though the use of the redistributors of this invention has been described above primarily with respect to packed towers, it will be understood that they may also be effectively used for liquid return from the walls of certain open-tower apparatus. In such towers the liquid is, in successive steps, forcefully dispersed, such as by sprays or rotating devices, from the center of the tower across the open tower space and onto the tower wall. The liquid is returned from the wall by baffles, cones, or other redistributors toward the center of the tower but at a lower level for further forced dispersion.

In the foregoing this invention has been described only in connection with preferred embodiments thereof. Many variations and modifications of the principles of the present invention within the scope of the description herein are obvious. Accordingly, it is preferred to be bound not by the specific disclosure herein, but only by the appending claims.

What is claimed is:

1. A tower for absorption, stripping, distillation, extraction and the like having liquid redistributor elements in a vertically spaced-apart relationship therein, each of said elements having a relatively narrow and substantially horizontally disposed annular section in intimate sealed engagement with the inner vertical wall of the tower, a plurality of radially and downwardly extending projections having arcuate side edges extending inwardly from said annular section, a side edge of each projection being coextensive with the side edge of the next adjacent projection in a continuous curve to provide an open space between adjacent projections extending from the annular section of each redistributor element, each of said projections tapering sharply to a point at the radial extremity thereof, the construction and arrangement being such that liquid flowing down the inner vertical wall of the tower will not be collected upon the annular section of a redistributor element but will be diverted immediately to a downwardly extending projection and directed over the radial extremity thereof for uniform redistribution toward the center portion of the tower.

2. A liquid redistribution element for use in towers for absorption, stripping, distillation, extraction and the like, said element having a relatively narrow and substantially horizontally disposed annular section, a plurality of radially and downwardly extending projections having concave side edges extending inwardly from said annular section, a side edge of each projection being coextensive with the side edge of the next adjacent projection in a continuous curve to provide an open space between adjacent projections extending from said annular section, each of said projections tapering sharply to a point at the radial extremity thereof, the construction and arrangement being such that liquid reaching said annular section will not be retained thereupon but will be diverted immediately to a downwardly extending projection and by reason of surface tension will flow down said projection and be discharged at the radial extremity thereof.

References Cited in the file of this patent

UNITED STATES PATENTS 2,639,130  Heere _____ May 19, 1953